INVENTORS
THOMAS B. MARTIN AND
KENNETH L. BERNINGER
BY
Spencer, Hardman & Fehr
Their ATTORNEYS Oct. 31, 1950　　T. B. MARTIN ET AL　　2,528,281
AIRCRAFT PROPELLER Filed May 30, 1945　　2 Sheets-Sheet 2

INVENTORS
THOMAS B. MARTIN AND
KENNETH L. BERNINGER
BY
Spencer, Hardman & Fehr
Their ATTORNEYS Patented Oct. 31, 1950

2,528,281

UNITED STATES PATENT OFFICE 2,528,281

AIRCRAFT PROPELLER

Thomas B. Martin and Kenneth L. Berninger, Dayton, Ohio, assignors to General Motors Corporation, Detroit, Mich., a corporation of Delaware Application May 30, 1945, Serial No. 596,610

3 Claims. (Cl. 170—160.33)

This invention relates to torque units and blade mountings for aircraft propellers.

One of the objects of the invention is to provide a torque unit for a propeller blade that will have the maximum area possible for the cross section of blade used.

Another object of the invention is to provide a torque unit for a propeller unit that can be assembled and adjusted from the out end of a blade socket without disturbing the blade mounting.

Another object of the invention is to provide a torque unit for a hydraulically controlled propeller, in which the blade anchoring member constitutes the fluid pressure cylinder housing a piston by which the shift in blade pitch is accomplished.

A still further object of the invention is to provide a propeller blade with a separable root portion leading to the exchange and replacement of blades without loss of time and without disturbance of associated structure.

Further objects and advantages of the present invention will be apparent from the following description, reference being had to the accompanying drawings wherein a preferred embodiment of the present invention is clearly shown.

Figure 1:
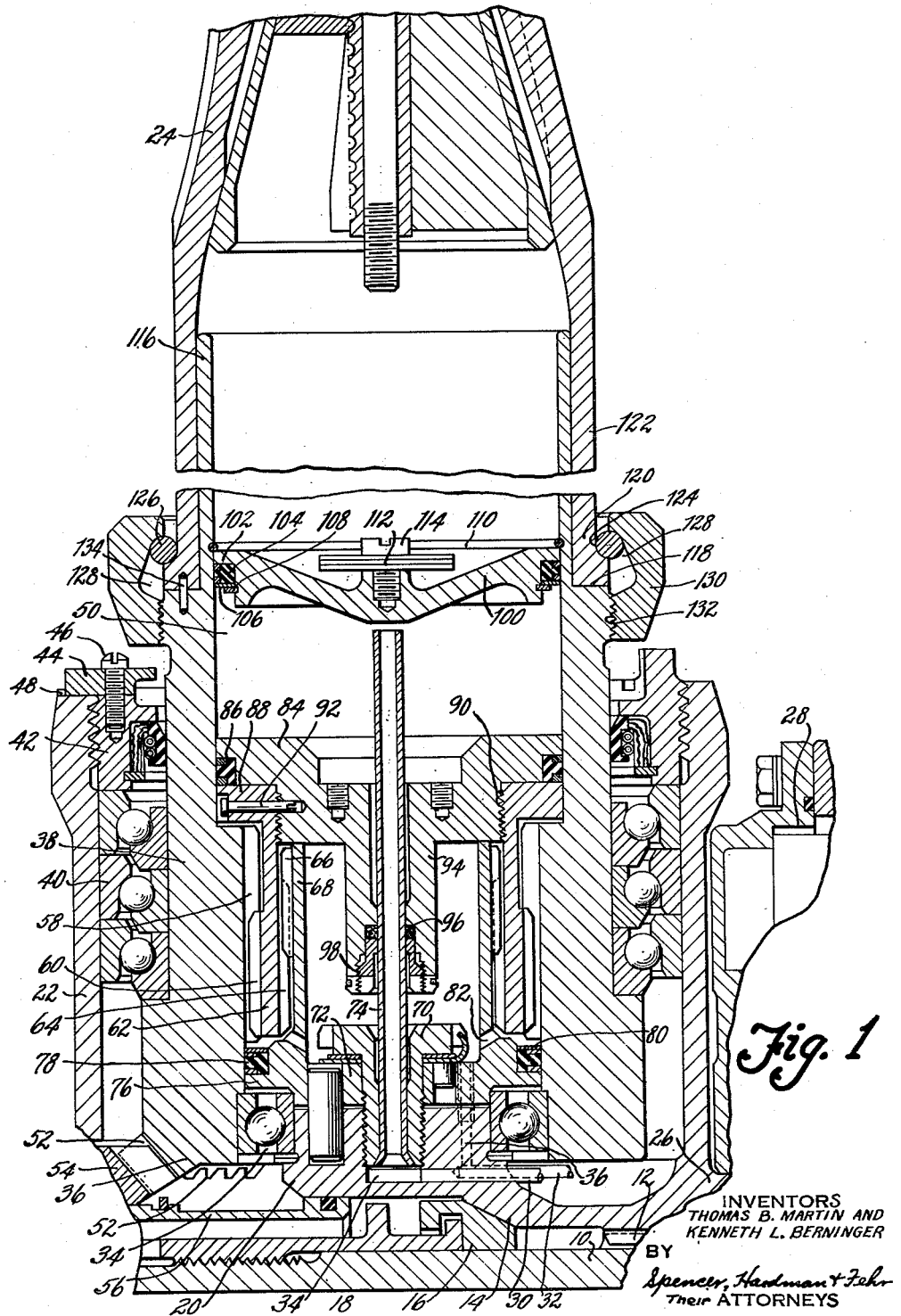
Fig. 1 is a longitudinal sectional view of a propeller blade and torque unit mounted in the socket of a propeller hub.

In one type of controllable pitch propellers, that is, where the propeller blades are each susceptible of rotating about their longitudinal axes within a retaining socket, for shifting the blade pitch, separate pressure actuated torque units are provided for each blade. It is customary to provide a fluid pressure cylinder and piston as a unit that are housed within a hollow root portion in the blade. Where that is done the active area of the piston is controlled by the cross sectional dimension of the hollow root, and when a complete pressure unit is housed within the propeller blade root the active area of the piston is comparatively small and of low efficiency as compared with the forces required for shifting the blade thru any pitch angle. The instant invention makes possible the use of a pressure chamber having the maximum active area for the blade construction involved. That is accomplished by using the hollow root portion of the blade itself as the fluid cylinder and fitting within it as large a piston as is possible.

A preferred construction adopting the improvements is disclosed in the attached drawing wherein a rotatable propeller shaft 10 has a splined engagement 12 with a hub 14 where it is retained by means of the usual cone 16 and shaft nut 18. The hub 14 provides a plurality of bosses 20 centered at the bottom of blade sockets 22 within which are anchored blades 24. An aft extension 26 of the hub supports a regulator 28 that contains controlling apparatus that develops and directs fluid pressure to one or the other of a pair of fluid passages 30 and 32 each ending in a chamber 34 and 36 of the hub boss 20. Seated around the boss 20 there is an anti-friction bearing 35 that pilots the butt end 36 of a blade root 38. The blade root being secured in place by stack bearings 40 disposed within the socket 22 and retained by a ring nut 42 threaded into the end of the socket 22. A lock plate 44 and screw device 46 operate to secure the nut against turning since the lock plate 44 is disposed in aligning edge notches 48 of the socket 22 and ring nut 42. In the present instance the hollow root 38 comprises a sleeve member having a step bore the larger of which 50 is radially outward of the bearing 34 and provides a pressure chamber. The radially inward end from the chamber 50, that is the end portion 36 supporting the bearing 34 is considerably thickened both inwardly and outwardly and terminates in the gear segment 52 adapted to interengage with the teeth of a master gear 54 supported and journalled on a bearing sleeve 56. A master gear 54 thus coordinates with rotation of one blade root with all of the others.

The smaller of the step bore of the root portion is helically splined at 58 such as to cooperate with external splines 60 on the outside of the piston skirt 62 that is interiorly splined at 64 to interengage with exterior splines 66 of a hollow spindle 68. The hollow spindle 68 is secured to the hub boss 20 by means of a cap nut 70 passing thru a bottom wall 72 of the spindle and threading into the boss 20. The cap nut 70 anchoring a transfer tube 74 that opens into a passage 34. The bottom wall 72 of the hollow spindle is outwardly flanged at 76 to fit within the smaller bore of the hollow root portion and seats a fluid seal 78 which is covered by a protector ring 80 to prevent chafing by engagement with the interior spline 58 of the root portion. Cross passages 82 thru the wall of the hollow spindle equalize the pressure and make for fluid flow from within the hollow spindle to the spline connection between the spindle, the piston skirt and the root splines.

Disposed to move within the chamber 50 of the hollow root there is a piston 84 that is peripherally grooved to receive a seal ring 86 held in place by a flange 88 of the piston skirt 82 which threads upon the piston 84 at 90 and is locked by cross pin 92. Centrally of the piston head 84 there is a tubular boss 94 that is apertured to pass the transfer tube 74. A seal ring 96 and nut device 98 proofing the slidable connection against leakage of pressure fluid. Thus the piston 84 spindle head 72 and root portion 38 form a pressure chamber within the hollow spindle 68 from which fluid communication is made from the chamber 36 by the transfer tube 32. The outer side of the piston 84 is bounded by the chamber 50 which is closed off by movable head member 100 having a flange 102 fitting within the bore 50 against which is seated the fluid seal ring 104 retained in place by a keeper ring 106 and a snap ring 108, a removable head assembly being retained in a selected position within a bore 50 by snap ring 110 seated in an internal groove of the chamber. If so desired the removable head member may carry balance washers or shims 112 which are centrally located and retained by means of a screw 114. With such an assembly and construction the piston assembly 84 with its skirt 62 is capable of movement within the chamber 50 between the head member 100 and a radially outward member and a member 68 which constitutes stops for the maximum movement of the piston. In any position of the piston within the cylinder, communication with the chamber 50 is made thru the transfer tube 54, chamber 34, and the passage 30.

The blade root portion 38 constitutes a separable part from the blade proper 24 and is accomplished by extending the tubular member with a hollow extension 116 thru which access may be had to the removable head 100 and piston 84. The extension 116 joins the root portion 38 with a shoulder 118 against which seats the terminating end of flange 120 of the blade after telescopically engaging about the extension 116. The flange 120 joins the shank of the blade 122 by a rounded shoulder 124 against which seats a filler piece 126 cammed into binding relation by a cam channel 128 of a blade coupling nut 130. The latter being threaded upon the blade root 38 as at 132. A locating pin or dowel 34 set into the shoulder 118 engages a recess or socket in the flange 120 such as to orient the blade 24 with respect to the gear segment 52.

Figure 2:
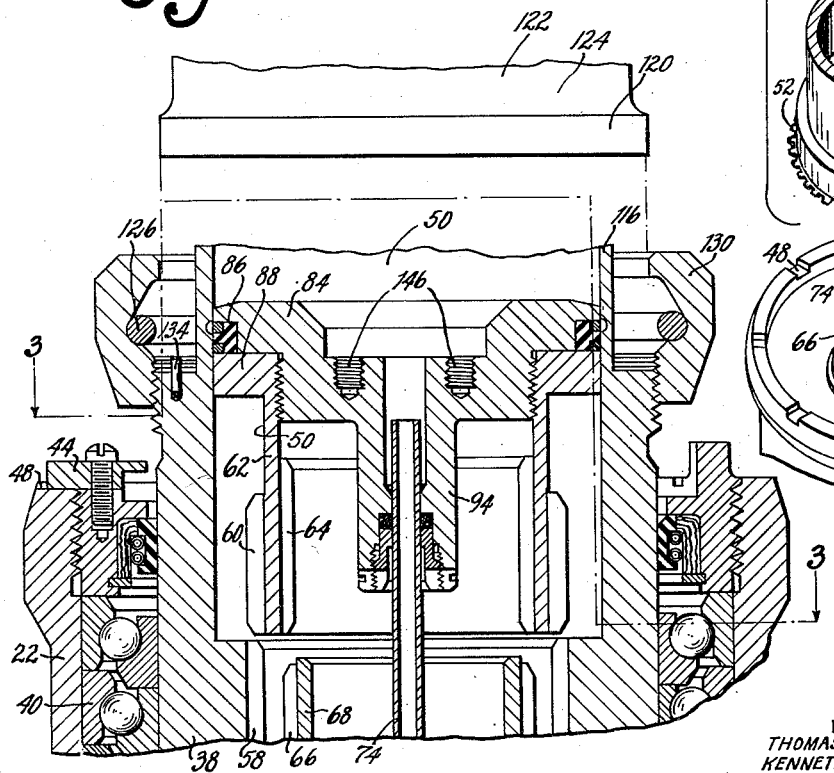
Fig. 2 is a fragmentary view of the same structure with parts moved in a different position.

Coupling and uncoupling of the blade 24 in blade root 38 may be easily and quickly accomplished by manipulation of the nut 130 which will either lock or release the filler ring 126. When the nut is loosened sufficiently a filler ring may be moved to the wider portion of the groove 128 which will allow withdrawal of the blade flange 120 from the nut 130. That being accomplished the extension 116 is thence opened to remove all obstruction to removal of the head member 100. On removal of the head member 100 the piston assembly may be withdrawn and replaced as desired. These provisions also make it possible to adjust the blade settings with respect to one another and thereby effect tracking of the blades or setting of a minimum blade angle. The provisions for doing so are illustrated in Fig. 2 where the blade proper is indicated as having been removed from about the extension 116 to afford adjustment or assembly of the parts.

Figure 4:
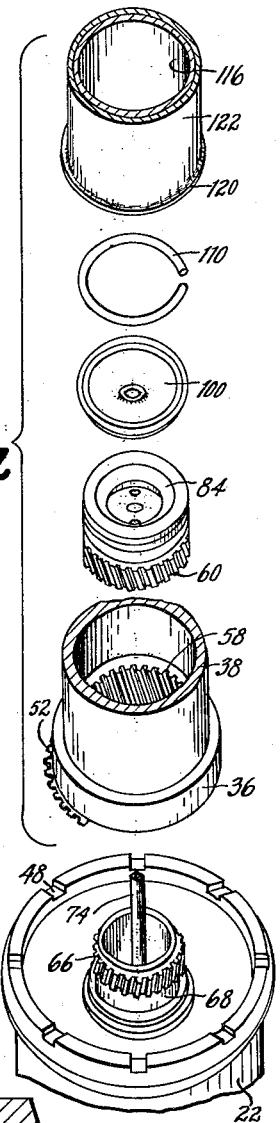
Fig. 4 is an exploded view of the assembly, illustrating the general order and relation of parts being assembled.

In assembling the propeller it is customary to follow the procedure indicated in Fig. 4 in which a fixed spindle 68 with bearing 34 are secured to the hub boss 20 and there locked securely in position. The blade root portion 38 is thence assembled within their respective sockets where they are retained by the bearings 40 with nut 42 and lock device 44. At this stage the blade roots are properly oriented by timing so to speak, the blade segments 52 by the master gear 54. Next there is brought into position a piston assembly 84 which is extended thru the portion 116 and caused to interengage with the splines in a predetermined manner. Following this the head assembly 100 is positioned within the extension 116 and the snap ring 110 seated in its groove. The whole assembly is thence completed by attaching the blade 24 to the root portion as has been indicated and tightening of the nut 130, whereupon the assembly will be complete and ready for operation.

Figure 3:
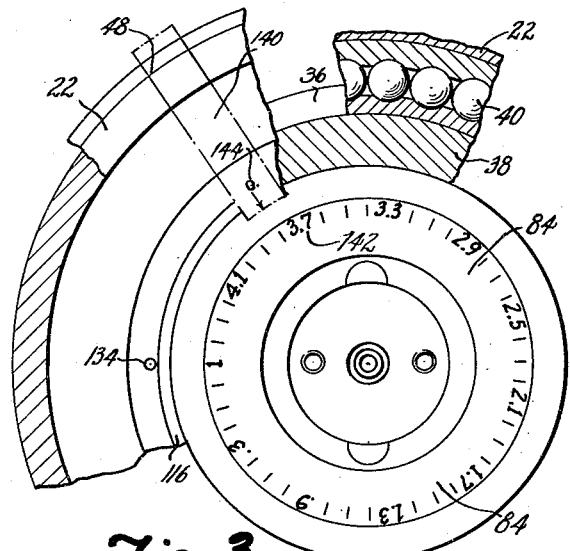
Fig. 3 is a fragmentary view in section transverse to the socket substantially as indicated by the lines and arrows 3—3 of Fig. 2.

In initial assembly of the parts, and occasionally during the life of the propeller it is desired to establish a predetermined interengagement of the splines to effect a low pitch setting or to change that setting when the propeller is installed upon a different engine combination. The dimensions, arrangements, and provisions are such that the blade roots mounted on their sockets may be turned therein to a certain specified angular relation which is usually accomplished by means of the jig or index strip 140 as shown by the dot and dash line Fig. 3 located in a particular notch 48 in a socket edge and coinciding with a stripe mark or index mark carried by the blade root 38. The piston assembly 84 usually carries proper indicia and graduations such as indicated by 142 that give an index as to the spline engagement that is proper for accomplishing a particular minimum angle of blade setting.

Making use of a specific example, and assuming that the indicia carried by the piston assembly is, "Index 38, Socket 2, Angle 24.4" etc., which means that the specified angle setting of 24.4 degrees is accomplished when that piston head is so oriented with the blade root 38 that the tooth number 38 coincides with an established reference point on the root portion 38, and also coincides with a particular tooth or spline of the spindle 68. To assist in the alignment, a jig or reference strip 140 is used that fits within a specified notch 48 in the edge of the socket, the jig having an index mark 144 that affords a temporary reference point. Following the indicia and information on the piston assembly, the angle mark "38" is adjusted to be coincident with the basic reference mark on the root member 38. This is accomplished by the piston assembly within the chamber 50 withdrawn from engagement with the splines 58 and 56 as shown in Fig. 2. While the parts are in this relation, that is, with the splines 58 and 66 disengaged, the piston assembly may be rotated relative to the root portion 38 by means of a special tool applied to the piston assembly at 146. When proper radial alignment is established between the number 38 tooth of the piston member and the basic reference on the root portion 38, then the piston assembly is depressed somewhat or until the splines 58 and 60 are engaged, but not so far that the splines 64 and 68 are engaged. At the time of this partial engagement of the splines 58 and 60 then rotation of the engaged piston and root portion will align the tooth "38" and basic reference on the root portion with the index mark 144 on the jig or strip 140, upon which further depressing movement of the piston head will engage the splines 64 and 68. If the coordination of the blade settings has been perfected then further depression of the piston within the chamber will secure the angular relation of the blade root with the spindle. Otherwise the blade root and piston assembled therewith may be turned within the socket until the scale 140 and root indicia indicate the proper relation, which can be followed by further depression of the piston to engage the splines 66. Seating of the head assembly 100 secures the splined relation and prevents any derangement until the head is again withdrawn. Thus to adjust the minimum blade angle it is only necessary to separate the blade from its root portion, leaving the root portion within the socket, make the change and recouple the blade to the root portion.

While the embodiment of the present invention as herein disclosed, constitutes a preferred form, it is to be understood that other forms might be adopted, all coming within the scope of the claims which follow.

What is claimed is as follows:

1. In a controllable pitch propeller, the combination comprising, a hub providing blade sockets, a fluid pressure actuated unit mounted in the socket for shifting the blade to different pitch settings, including a propeller blade hollow root portion journalled in the socket and having driven relation with said pressure actuated unit, a hollow stub extending from the root to surround the pressure actuated unit, a propeller blade having a shank enveloping the hollow stub, means defining the angular relation of the blade shank and stub, and self-seating means for locking the blade shank on the stub in defined angular relation.

2. The combination set forth in claim 1, wherein the locking means comprises a threaded ring on the end of the root portion and having an undercut, a spring ring lodged in the undercut, and a shoulder on the exterior of the blade shank to be engaged by the spring ring when the threaded ring is run down on the root portion.

3. In an aircraft propeller having a hub with blade sockets, the combination comprising, a tubular member providing a fluid pressure cylinder journalled for rotation in said sockets, a spindle secured to the hub piloting the tubular member at its radially inward end, a piston having helical spline engagement with the tubular member and the spindle, a removable head member secured within the radially outward end of the tubular member, said piston being progressively disengageable from the spindle spline and the tubular spline without removal from the tubular member, whereby the tubular member may be indexed relative to the blade socket when the head member is removed, a propeller blade carried by the tubular member, and coupling means for securing the blade on the tubular member in a predetermined angular relation.

THOMAS B. MARTIN.
KENNETH L. BERNINGER.

REFERENCES CITED

The following references are of record in the file of this patent:

UNITED STATES PATENTS

| Number | Name | Date |
|---|---|---|
| 798,078 | Simpson | Aug. 29, 1905 |
| 2,113,438 | Allred | Apr. 5, 1938 |
| 2,147,078 | Barish | Feb. 14, 1939 |
| 2,307,101 | Blanchard et al. | Jan. 5, 1943 |
| 2,375,429 | Martin | May 8, 1945 |

FOREIGN PATENTS

| Number | Country | Date |
|---|---|---|
| 99,774 | Sweden | Sept. 3, 1940 |
| 499,518 | Great Britain | Jan. 25, 1939 |
| 539,303 | Great Britain | Sept. 4, 1941 |
| 775,507 | France | Dec. 31, 1934 |